3,600,270
TRANSPARENT PAPER FOR PHOTOGRAPHIC PURPOSES
Gregor Kemme, Osnabruck, Germany, assignor to Felix Schoeller, Jr., Osnabruck, Germany
No Drawing. Filed Sept. 25, 1967, Ser. No. 670,392
Claims priority, application Germany, Sept. 27, 1966, Sch 39,582
Int. Cl. G03c 1/80
U.S. Cl. 161—251          3 Claims

ABSTRACT OF THE DISCLOSURE

A transparent and preferably waterproofed photographic paper made up of a plurality of layers, the basis of which is highly transparent cellulose paper layers bonded together by an ionomer.

BACKGROUND TO THE INVENTION

Highly transparent papers are generally protected against the action of moisture by being lacquered on both sides, such products being used as a transparent base for light-sensitive coatings. Another known practice consists in sticking two highly transparent papers together with polyolefine and then also coating the two outer faces with polyolefine. This combination stock serves the same purpose as the lacquered article, being used as a dimensionally stable, transparent base for light-sensitive coatings.

Owing to a certain porosity in ordinary lacquers, material lacquered on both sides is not altogether dimensionally stable and, moreover, shows signs of ageing, whilst material produced from two runs of paper stuck together with polyolefine is completely damp-proof. This, however, has the disadvantage, especially in the case of such transparent papers as are softened with polyhydroxy compounds, that the adhesion of the polyethylene films is poor, so that the individual runs may come apart as soon as subjected to mechanical or thermal stresses. It is true that reliable adhesion of the polyalkylene layers on the highly transparent paper can be ensured by pre-coating in the usual way with, for example, soluble silicic acid derivatives, organic titanium compounds, special dispersions of plastics and the like, but such preliminary coatings have a markedly adverse effect on the transparency of the end product.

SUMMARY OF THE INVENTION

It has now been discovered that the above mentioned disadvantages of conventional composite waterproofed papers can be avoided if, for sticking the individual highly transparent papers together and coating them, use is made of an extrudable co-polymer of $\alpha$-olefines and $\alpha,\beta$-unsaturated polar monomers.

By way of unsaturated polar monomers, use may be made of, for example, vinyl acetate, (meth-) acrylic acid ester and unsaturated mono-carboxyilc and dicarboxylic acids. The amount of polar monomer in the co-polymer should preferably be between 5% and 15%. Particular suitable co-polymers for the purpose of the invention are those of ethylene or propylene and partly neutralised $\alpha,\beta$-unsaturated monocarboxylic acids, which are described as ionomer resins.

It has been found that when these extrudable copolymers are used in accordance with the invention, they produce the desired effect even in very thin coatings of about 0.007 mm. to 0.01 mm. The ionomer resin or other $\alpha$-olefine co-oplymers containing polar groups should preferably be extruded from a wide-slot nozzle, directly from the melt, between the runs of paper that are to be joined in layers, these being then pressed together. A pair of rollers working together in the conventional way, for example, may be used for this purpose, the runs of paper that are to be joined in layers converging as they enter the roller throat, while the wide-slot nozzle from which the ionomer resin is extruded extends between the runs of paper. However, any other method of application for which facilities are available may also be used.

Although, following the joining together of the two runs of paper, the unprotected faces of the laminate can be waterproofed in any desired manner, such as lacquering or coating by extrusion, there is particular advantage in making use, for these coatings as well, of co-polymers with polar groups in the molecule, preferably ionomer resins. A normal adhesive coating then being applied, it becomes a simple matter to use this as an anchorage for the light-sensitive emulsion and whatever further coatings may be required.

DESCRIPTION OF THE PREFERRED EMBODIMENTS

Example 1

Two runs of highly transparent detail drawing paper (weight approx. 40 g./m.) are stuck together with the aid of a conventional extrusion coating and laminating machine, ionomer resin e.g. Surlyn A, Type ER–1601, made by the Du Pont Company, being extruded between the two convergent runs of paper, which are thereupon pressed together between two rollers. The same extrusion coating machine is then used to coat this laminate on both sides with ionomer resin and to apply to one side or both sides an adhesive coating of conventional type, such as polycyclopentadiene or polyamide/gelatine mixtures, to which conventional light-sensitive emulsions can be readily bonded.

Although only two runs of paper are joined together with ionomer resin in the above example, several such layers can be joined in a similar manner—either simultaneously, several wide-slot nozzles being positioned between adjacent faces of the paper, or by repeating the process described in the example. The advantage of coating the outer faces of the laminate with ionomer resin instead of with lacquer or some other coating material is that the laminate is fully waterproof and age resistant and that the bond between the ionomer resin coating and the paper has far better resistance to mechanical and thermal stresses.

Example 2

Two runs of highly transparent detail drawing paper are stuck together as in Example 1. The bonding agent used is a co-polymer of ethylene and acrylic acid ester. The proportions of the monomers in the co-polymer are 85:15 to 95:5 (e.g. Bakelite BPD 6169, made by Union Carbide Corp.). The transparent laminate thus prepared is coated on both sides with a pure polyolefine by means of an extrusion coating machine, and—if necessary—provided on one side or both sides with further coatings determined by the purpose for which the material is to be used, after prior oxidising treatment by, for example, corona discharge. Such coatings may be, for instance, one to provide adhesion for light-sensitive emulsions and/or an anti-halation backing and/or a sliding coating and/or a transparent coating of pigment and binding agent that will take writing.

Example 3

Two runs of highly transparent detail drawing paper are stuck together as in Example 1. The bonding agent used is a co-polymer of ethylene and vinyl acetate having a monomer ratio of 80:20 or a mixture of this co-polymer with polyethylene in a ratio of, for example, 1:1. The laminate thus produced is then treated on both sides in the conventional way with a standard nitrocellulose lacquer and provided, if desired, with further coatings such as are customary for photographic purposes (cf. Example 2).

What I claim is:

1. A transparent photographic paper consisting essentially of
   (a) a plurality of highly transparent cellulose paper layers,
   (b) at least two of which layers are bonded together by an ionomer extruded therebetween in a thickness of from 0.007 mm. to 0.01 mm.,
       said ionomer consisting of a co-polymer of
           (i) an α-olefin selected from ethylene and propylene, and
           (ii) an α,β-unsaturated polar monomer selected from vinyl acetate, meth-acrylic acid ester, and unsaturated mono-carboxylic and di-carboxylic acids,
       said polar monomer content of the ionomer is in the range of from 5–15% by weight,
   thereby to provide a transparent, waterproofed photographic base paper having improved dimensional stability, resistance to aging, dampproofness, adhesion of layers, and resistance to thermal and mechanical stresses.

2. A transparent photographic paper according to claim 1 in which at least one face of the bonded layers is coated by extrusion of said ionomer.

3. A transparent photographic paper according to claim 2 in which the surface coating of ionomer is covered with a coating which provides adhesion for a light-sensitive photographic emulsion, said coating being selected from polycyclopentadiene and polyamide/gelatine mixtures.

References Cited
UNITED STATES PATENTS

| | | | |
|---|---|---|---|
| 3,201,374 | 8/1965 | Simms | 161—250X |
| 3,201,498 | 8/1965 | Brunson et al. | 161—250X |
| 3,215,678 | 11/1965 | Adelman | 161—250X |
| 3,260,602 | 7/1966 | Wood et al. | 96—85 |
| 3,264,272 | 8/1966 | Rees | 161—250 |

RONALD H. SMITH, Primary Examiner

U.S. Cl. X.R.

96—85, 87; 161—250